US008817799B2

(12) United States Patent
Koren et al.

(10) Patent No.: US 8,817,799 B2
(45) Date of Patent: Aug. 26, 2014

(54) NETWORK PROCESSOR FOR SUPPORTING RESIDENTIAL GATEWAY APPLICATIONS

(75) Inventors: Asaf Koren, Natanya (IL); Ifat Naaman, Hod Hasharon (IL); Eliezer Weitz, Holon (IL); Alex Goldstein, Natanya (IL); Yariv Aviram, Bet Yehoshua (IL)

(73) Assignee: Broadcom Corporation, Irvine, CA (US)

( * ) Notice: Subject to any disclaimer, the term of this patent is extended or adjusted under 35 U.S.C. 154(b) by 316 days.

(21) Appl. No.: 13/086,753

(22) Filed: Apr. 14, 2011

(65) Prior Publication Data

US 2012/0263462 A1    Oct. 18, 2012

(51) Int. Cl.
*H04L 12/28* (2006.01)

(52) U.S. Cl.
USPC ............................................. 370/401

(58) Field of Classification Search
USPC .................................. 370/401, 402, 404
See application file for complete search history.

(56) References Cited

U.S. PATENT DOCUMENTS

| 6,330,584 | B1 | 12/2001 | Joffe et al. |
| 6,460,146 | B1 * | 10/2002 | Moberg et al. ................. 714/10 |
| 7,370,127 | B2 | 5/2008 | Avishai et al. |
| 7,379,676 | B2 | 5/2008 | Kang et al. |
| 7,404,015 | B2 * | 7/2008 | Zemach et al. ................. 710/22 |
| 7,643,753 | B2 * | 1/2010 | Weitz et al. ..................... 398/67 |
| 7,660,793 | B2 * | 2/2010 | Indeck et al. .......... 707/999.005 |
| 7,801,161 | B2 | 9/2010 | Levy et al. |
| 8,077,732 | B2 * | 12/2011 | Voit et al. ...................... 370/401 |
| 2004/0037302 | A1 * | 2/2004 | Varma et al. .................. 370/412 |
| 2004/0136712 | A1 | 7/2004 | Stiscia et al. |
| 2004/0202470 | A1 | 10/2004 | Lim et al. |
| 2005/0185646 | A1 * | 8/2005 | Karino et al. ................. 370/389 |
| 2006/0083253 | A1 | 4/2006 | Park et al. |
| 2007/0074218 | A1 | 3/2007 | Levy et al. |
| 2007/0201872 | A1 | 8/2007 | Yim et al. |
| 2009/0060530 | A1 | 3/2009 | Biegert et al. |

* cited by examiner

*Primary Examiner* — Mohammad Anwar
(74) *Attorney, Agent, or Firm* — Sterne, Kessler, Goldstein & Fox P.L.L.C.

(57) ABSTRACT

A network processor for performing residential gateway processing tasks. The network processor includes a first cluster of packet processors and a second cluster of packet processors, wherein each of the first cluster and the second cluster includes a main packet processor and a secondary packet processor, wherein the main packet processor performs at least routing of incoming packets and the secondary packet processor performs off-loading tasks for the main packet processor; a plurality of Ethernet media access control (MAC) adapters for interfacing with a plurality of subscriber devices connected to a residential gateway; an external-network MAC adapter for interfacing with a wide area network (WAN) connected to the network processor; and an ingress handler for at least load balancing the processing of packets between the first cluster and the second cluster.

21 Claims, 5 Drawing Sheets

US 8,817,799 B2

NETWORK PROCESSOR FOR SUPPORTING RESIDENTIAL GATEWAY APPLICATIONS

TECHNICAL FIELD

The present invention relates generally to network processors operable in residential gateways.

BACKGROUND OF THE INVENTION

As the demand from users for bandwidth rapidly increases, optical transmission systems, where subscriber traffic is transmitted using optical networks, are being installed to serve this demand. These networks are typically referred to as fiber-to-the-curb (FTTC), fiber-to-the-building (FTTB), fiber-to-the-premise (FTTP), or fiber-to-the-home (FTTH). Each such network provides access from a central office (CO) to a building, or a home, via, e.g., optical fibers installed near or up to the subscribers' locations.

Examples of optical transmission systems include passive optical network (PON), such a Gigabit PON (GPON), an Ethernet PON (EPON), and Active Ethernet. An Active Ethernet is a type of a FTTP network that uses optical Ethernet switches to distribute the signal, thus incorporating the customers' premises and the central office into a switched Ethernet network.

An exemplary diagram of a typical PON 100 is schematically shown in FIG. 1. The PON 100 includes M optical network units (ONUs) 120-1 through 120-M, coupled to an optical line terminal (OLT) 130 via a passive optical splitter 140. Traffic data transmission may be achieved by using two optical wavelengths, one for the downstream direction and another for the upstream direction. Downstream transmission from the OLT 130 is broadcast to all ONUs 120. Each ONU 120 filters its respective data according to, for example, pre-assigned labels. ONUs 120 transmit respective data to OLT 130 during different time slots allocated by OLT 130 for each ONU 120. Splitter 140 splits a single line into multiple lines, for example, into lines 1 to 32, or, in the case of a longer distance from OLT 130 to ONUs 120, into lines 1 to 16.

The GPON, EPON or Active Ethernet systems are currently being adopted by many telecommunication companies in order to deliver high-speed data services to their subscribers. These services typically include a bundle of TV broadcasting, Internet, and telephone services.

To provide these services an ONU 120 is connected to a residential gateway installed in the premises. As illustrated in FIG. 2 an input of a residential gateway 210 is connected to the ONU 120. The gateway's 210 outputs are coupled to, for example, a telephone device 220, a TV set-top box 230, and a computer 240 to provide Internet connectivity. Generally, a residential gateway may provide the functionality of a modem and router and may be, for example, a cable modem, a router, a switch, a wireless modem, a wireless router, and so on.

Specifically, network units, such as ONUs are equipped with a network processor (e.g., PON processor) utilized to receive the downstream traffic from a terminal unit (e.g., an OLT), and provide the contents of the downstream traffic to one or more subscriber devices, i.e., devices connected to the gateway 210. Similarly, the network processor is designed to receive and transmit upstream data from the one or more subscriber devices to the terminal unit via the network, e.g., the passive optical network.

Because residential gateways are required to support advanced applications and to process high volumes of traffic, the currently available network processor, and especially PON processors, have become bottlenecks which limit the performance of residential gateways. For example, such processors cannot efficiently support security applications, such as firewalls, attacks prevention, and IP security (IPSEC) protocol, while performing the traditional networking processing tasks of switching and bridging.

Therefore, it would be advantageous to provide a network processor that supports the processing requirements of residential gateways.

SUMMARY OF THE INVENTION

Certain embodiments of the invention include a network processor for performing residential gateway processing tasks. The network processor comprises a first cluster of packet processors and a second cluster of packet processors, wherein each of the first cluster and the second cluster includes a main packet processor and a secondary packet processor, wherein the main packet processor performs at least routing of incoming packets and the secondary packet processor performs off-loading tasks for the main packet processor; a plurality of Ethernet media access control (MAC) adapters for interfacing with a plurality of subscriber devices connected to a residential gateway; an external-network MAC adapter for interfacing with a wide area network (WAN) connected to the network processor; and an ingress handler for at least load balancing the processing of packets between the first cluster and the second cluster.

Certain embodiments of the invention also include a cluster of packet processors operable in a network processor. The cluster of packet processor includes a main packet processor for performing a task of at least routing of incoming packets; a secondary packet processor for performing at least off-loading tasks for the main packet processor; a set of accelerators shared by the main packet processor and secondary packet processor; a data memory unit shared by the main packet processor and secondary packet processor; and an internal bus for communicating between the main packet processor and the secondary packet processor.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
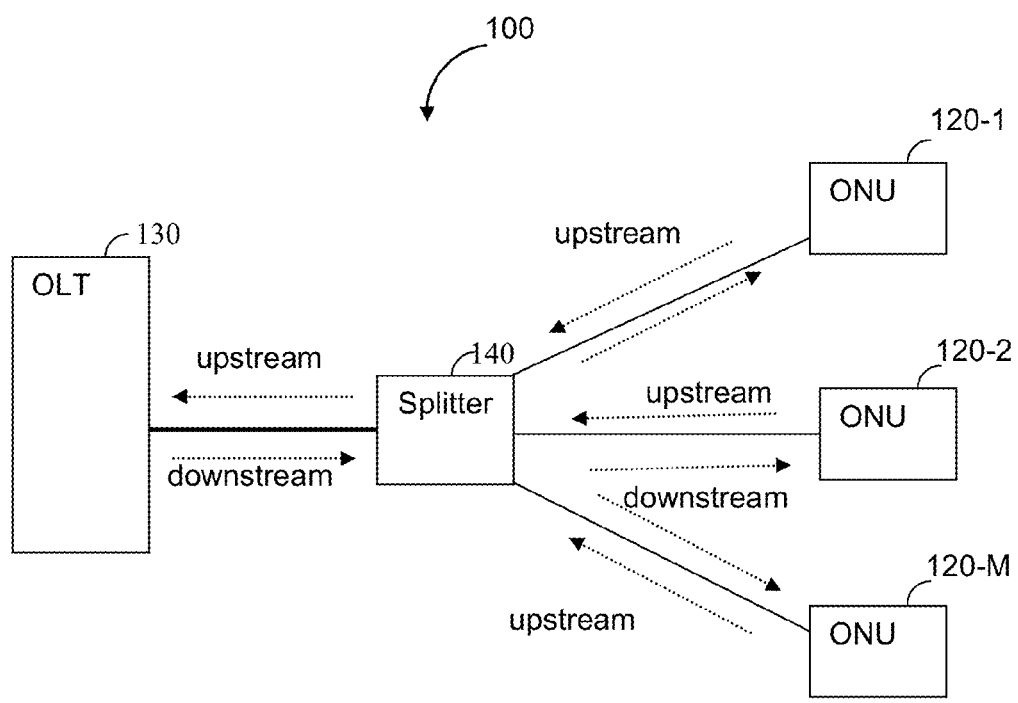
FIG. 1 is an exemplary diagram of a PON.
Figure 2:
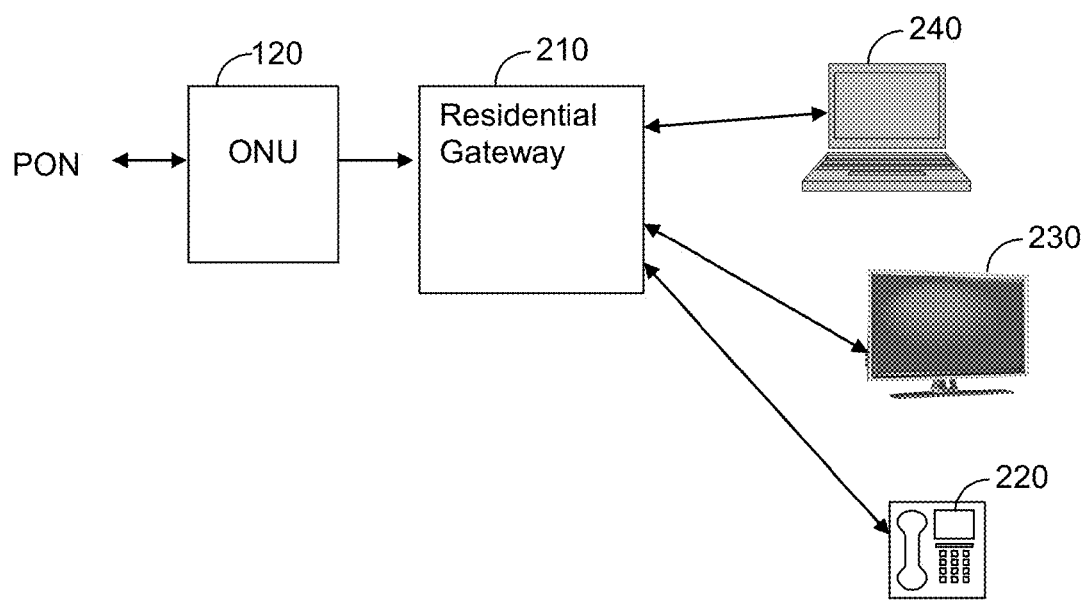
FIG. 2 shows a typical installation of a residential gateway connected to an ONU.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3:
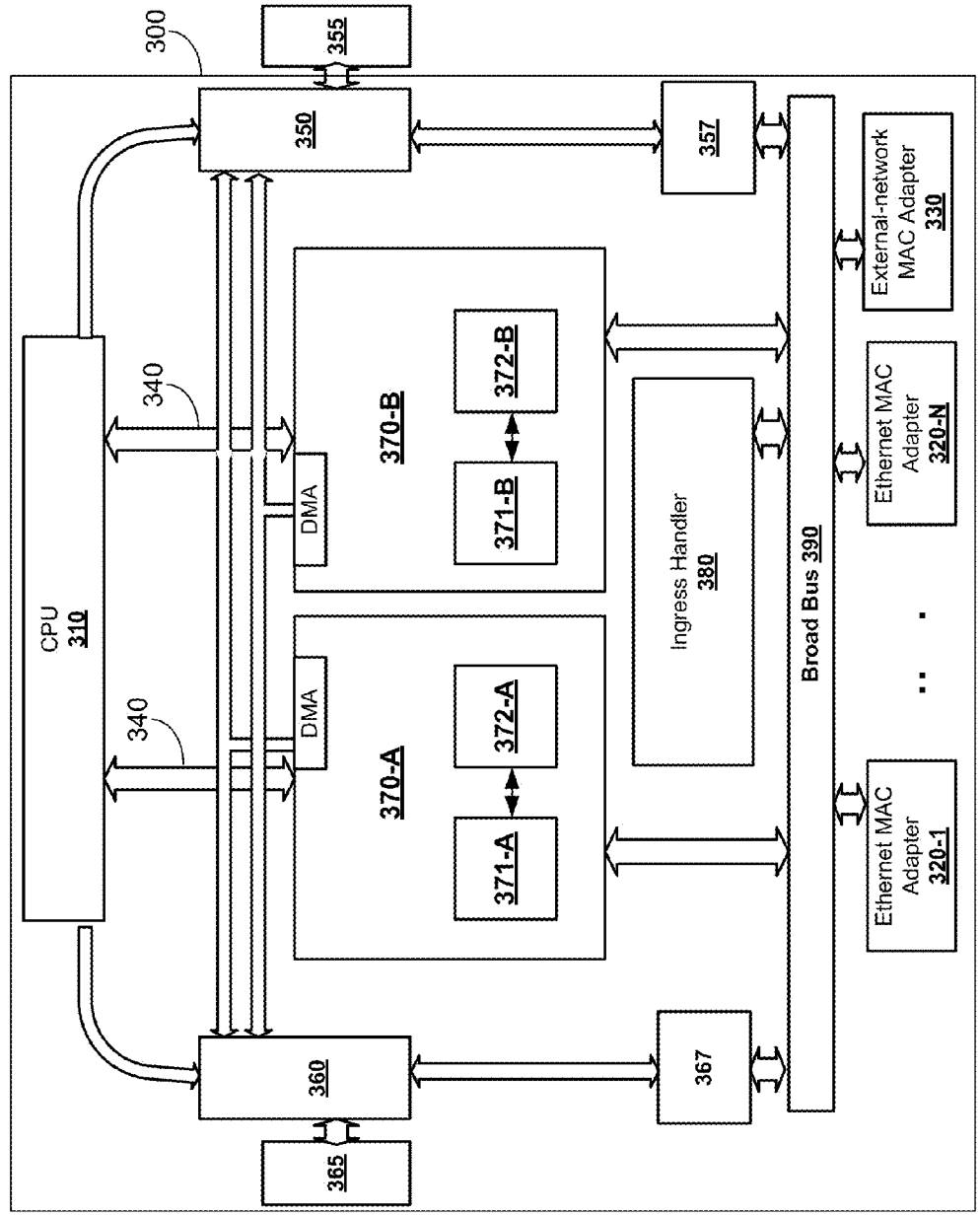
FIG. 3 is a diagram of a network processor in accordance with an embodiment of the invention.

FIG. 3 shows a non-limiting and exemplary block diagram of an architecture of a network processor 300 implemented in accordance with an embodiment of the present invention. The network processor 300 includes a central processing unit (CPU) 310, a plurality of Ethernet media access control (MAC) adapters 320-1 through 320-N, an external-network MAC adapter 330, an external memory arbiter 350 that arbiters requests to an external memory 355, and internal memory arbiter 360 that arbiters requests to an internal memory 365. The external memory 355 is typically larger and slower than the internal memory 365. In an embodiment of the invention, the external memory 355 is a DDR type while the internal memory 365 is a SRAM type. The memories 355 and 365 are connected to a broad bus 390 through direct memory access (DMA) controllers 357 and 367 respectively.

In accordance with an embodiment of the invention, the network processor 300 is designed to include a grid of packet processors 370 and an ingress handler 380. According to an embodiment of the invention, the grid of packet processors 370 is grouped into two clusters 370-A and 370-B, each of which includes two packet processors. Therefore, according to this embodiment, the network processor 300 includes 4 packet processors to serve processing of high volume traffic and residential gateway applications. As will be described in detail below, packet processors in each of the clusters are identical, but perform different tasks. There is also task separation between two packet processors (371-A and 372-A or 371-B and 372-B) in each cluster. For the sake of brevity and without departing from the scope of the invention, the packet processors 371-A and 371-B will be referred hereinafter as the "main packet processors" while the processors 372-A and 372-B will be referred hereinafter as the "secondary packet processors".

In an embodiment of the invention, the main packet processor is designed with higher processing power relative to the secondary packet processor. However, the secondary processors are designed to efficiently perform time-consuming tasks including, but not limited to, packets' header modifications, QoS mapping, egress handling, and the like. It should be appreciated that off-loading such tasks from the main packet processors 371-A and 371-B enables these processors to efficiently perform the networking tasks, such as packets bridging and routing as well as residential gateway tasks including, for example, encrypting/decrypting packets, blocking unauthorized access, routing of packets, switching packets, network address translation (NAT), and blocking of attacks by means of firewall or other security techniques. A detailed discussion of the main and secondary packet processors is provided below. The communication between the CPU 310 and the packet processors in the clusters 370-A and 370-B is through an internal inter-connect bus 340.

The ingress handler 380 is also connected to the broad bus 390 and acts as an interface between the peripherals, i.e., the external-network and Ethernet MAC adapters and the packet processors in the clusters 370-A and 370-B. Specifically, the ingress handler 380 performs the tasks related to determining the destination memory (355 and 365) for a payload of an incoming packet, determining which of the clusters 370-A or 370-B should process the incoming packet, and offloading tasks. The offloading tasks include, but are not limited to, maintaining lookup tables to map the destination and source MAC addresses used for accessing both GPON and Ethernet MAC adapters, parsing of incoming packets, and management of ingress queues for the packet processors in the clusters 370-A or 370-B. This includes providing the target cluster with a detailed packet descriptor, parsing results, lookup results, and packet headers of an incoming packet.

The ingress handler 380 decides on the target cluster 370-A or 370-B for processing the incoming packet based on a load balancing schema, an input physical port for the incoming packet, or combination thereof. The load-balancing schema is based in part on the current processing load, where the least busy cluster is selected. It should be appreciated that the load-balancing schema enables, unlike prior art solutions, processing of both upstream and downstream packets by both clusters. Therefore, the ingress handler 380 enables dynamic utilization of processing time for upstream, downstream, and local switching of data packets, based in part on the actual traffic load, and/or the load of each cluster 370.

The ingress handler 380 determines the destination memory (355 or 365) for the packet payload based on at least one of the following: the results of the lookup tables (e.g., source address, destination address, or both), static configuration (e.g., input port number), packet parsed information (e.g., protocol type, VLAN tags, priority bits, etc.) or a combination thereof.

It should be appreciated that saving data in the internal memory 365 allows improving the bandwidth utilization of the external memory 355, and thus the overall performance of the network processor 300. For example, local switching packets are redirected to the internal memory 365, based on the lookup results. Such packets are typically routed between devices connected to the Ethernet MAC adapters 320-1 through 320-N. In an embodiment of the invention, the local memory 365 may also be utilized as a general memory for various applications, for example, allocating additional memory to the CPU 310 and/or packet processors in the clusters 370-A and 370-B.

The broad bus 390 connects between the clusters of packet processors 370-A and 370-B, the Ethernet adapters 330-1 through 330-N and the External-MAC adapter 330. The broad bus 390 transfers data at high rates and its architecture is based on a push-ahead mechanism, using a binary tree topology. The broad bus 390 supports parallelism in read-and-write transactions and allows simultaneous transfer of data from various units at the same time. A detailed description of the broad bus 390 can be found in U.S. Pat. No. 7,370,127 assigned in common to the same assignee as the present application, and which is hereby incorporated for all that it contains. In a preferred embodiment, the broad bus 390 communicates with the various components using broad bus handlers (BBH).

The CPU 310 executes commands received from the packet processors in the cluster 370-A and 370-B. The CPU 310 performs fast processing, where the execution of each command is completed in one clock cycle. In an exemplary embodiment of the present invention, the CPU 310 may be a high-performance MIPS CPU including at least an instruction cache and a data cache.

Each of the Ethernet MAC adapters 320-1 through 320-N includes an Ethernet interface for interfacing with subscriber devices, such as computers, setup boxes, wireless devices, and so on. Typically, devices connected in the Ethernet MAC adapters 320-1 through 320-N are connected in a LAN. An Ethernet MAC adapter 320-$j$ ($j=1, \ldots, N$) is capable of receiving upstream data flow from subscriber devices and transmitting downstream data to subscribers. Either upstream or downstream data flows are respectively forwarded to or received from the packet processors 370-A and 370-B via the broad bus 390. More specifically, the Ethernet MAC adapter 320-j in the downstream direction handles IPTV packets. Such packets encapsulate video data of a program being broadcast. In addition, downstream data includes IP packets received from a WAN (through the external-network adapter 330) and are bridge routed, through an Ethernet MAC adapter 320-j to one of the computers of a LAN. The routing is performed by one of the cluster packet processors 370-A and 370-B. Upstream data includes packets received, through the Ethernet MAC adapters 320-j from computers connected to a LAN.

In accordance with an embodiment of the invention, the external-network adapter 330 is a GPON MAC adapter that processes upstream and downstream traffic in accordance with the GPON standard. The GPON standard is designed to allow data transmission at a rate of up to 2.488 Gbps while ensuring data security and quality of service (QoS). The GPON MAC adapter supports a plurality of traffic containers (T-CONTs). A T-CONT is a virtual upstream channel to which bandwidth is granted by the OLT. A single T-CONT can be allocated for an ONU, a class of service (CoS), or a logical ONU.

In accordance with other embodiments, the external-network adapter 330 can process traffic according to the communication standards including, but not limited to, Active Ethernet, or Digital Subscriber Line (DSL). In alternative embodiments, to network processor 330 may be connected to an EPON modem, an Active Ethernet mode, or a DSL modem, through an Ethernet port (not shown) to support the respective communication standards. It should be noted that the processing tasks performed by the cluster of processors are regardless of type of the external network.

Figure 4:
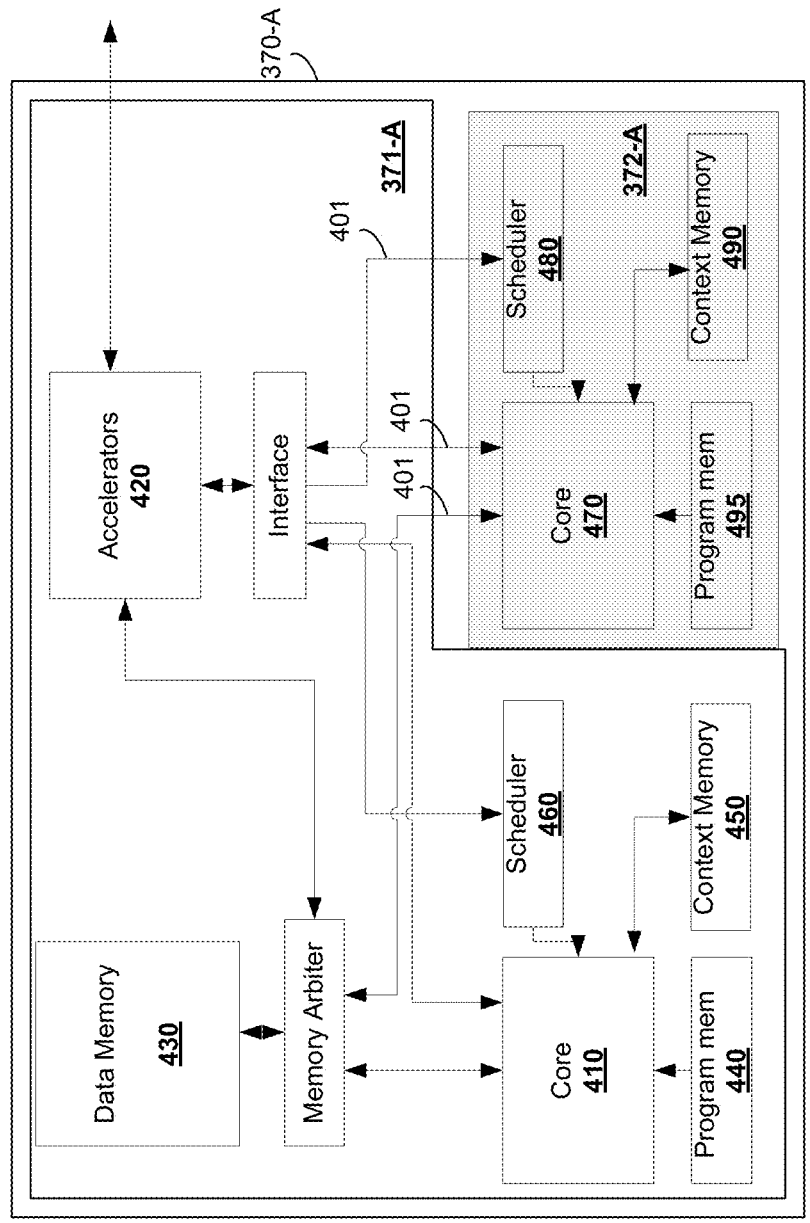
FIG. 4 is a diagram of a cluster of packet processors in accordance with an embodiment of the invention.

FIG. 4 shows an exemplary block diagram of a cluster of packet processors 370-A in accordance with an exemplary embodiment of the invention. For sake of brevity and without departing from the scope of the invention, only the cluster 370-A is illustrated herein. However, it should be noted that the structure and the functions of the packet processors in the cluster 370-B are similar.

The cluster 370-A includes the main packet processor 371-A and secondary packet processor 372-A that communicate with each other using an internal bus 401. The main packet processor 371-A includes a core processor 410 connected to a set of accelerators 420, a data memory unit 430, a program memory unit 440, and a context memory 450. The set of accelerators 420 and data memory unit 430 are shared by the main packet processor 371-A and second packet processor 372-A.

The execution of tasks by the core 410 is scheduled by a scheduler 460. The scheduler 460 receives requests from the different request generators and determines the next thread number when a context switch is triggered. The next thread may be selected according to a predefined priority policy.

The core 410 in the main packet processors 371-A may be, for example, a RISC processor that is designed to execute processing tasks with a minimal latency. For this purpose, all arithmetic and logic operations as well as source and destination variables are register based. The only operations that require access to the data memory 430 are load and store operations. Furthermore, the core 410 is designed with separate channels utilized for program and data access. The program memory 440 is a read only memory that holds tasks' instructions and is accessible by the CPU 310 (see FIG. 3).

The data memory 430 is a read/write memory that keeps data of the various tasks, and the context memory 450 includes instances of registers used by respective packet processors 371-A and 372-A. The accelerators 420 are dedicated hardware processing components designed to increase the performance of packet processors 371-A and 372-A by speeding up time-consuming tasks. These dedicated processing components (not shown) include at least a security engine, a cyclical redundancy checking (CRC) engine, a direct memory access (DMA), a board bus interface, an external memory lookup engine, Semaphores for synchronization between the two packet processors 371-A and 372-A, and general purpose timers for different time counting tasks, such as rate limiting.

A CRC engine enables the fast CRC calculation when error detection and correction is required. The CRC accelerator operates off-line on data stored in data memory 430. The DMA accelerator is responsible for data transfer from and to the data memory 430 and the external memory 355 or internal memory 365. The security engine provides a mechanism for IPSec processing by implementing HW accelerators for decrypting, encrypting and authentication of packets. The encryption/decryption and authentication algorithms supported by the security engine include, but are not limited to, AES, 3DES, SHA-1 and MD-5, and the like.

As discussed above, the main packet processor 371-A is designed with more processing power relative to the secondary processor 372-A. With this aim, the second packet processor 372-A includes a core processor 470 served by a scheduler 480, a context memory unit 490, and a program memory unit 495. In an embodiment of the invention, the size of each of memory units 490 and 495 is smaller than the size of the program and context of memory units 440 and 450. In certain exemplary embodiments of the invention, the secondary packet processor 371-B includes multiple cores 470. The secondary packet processor 372-A can access and utilize the accelerators 420 and data memory 430 in the domain of the main packet processor 371-A, through the internal inter-connect bus 401. The core 470 may be a RISC processor, while the execution of tasks by the core 470 is scheduled by the scheduler 480.

Each of the main and secondary packet processors 371-A and 372-A is designed to perform certain tasks to enable efficient and fast processing of packets. Specifically, the main packet processor 371-A supports tasks, such as bridging of packets, routing of packets, and security processing tasks, such as IP security (IPsec) processing, decrypting, encrypting and authentication of packets.

The bridging task supports functionality, such as, but not limited to, filtering of packets based on Layer-2, Layer-3, and Layer-4 protocols' parameters (for trapping to CPU or drop of certain protocols such as ARP, IGMP, MLD), classification, header modification, forwarding, and QoS mapping. Classification of incoming traffic to flows is performed based on layer-2 field parameters, such as a VLAN tag. Flow parameters together with other packet fields, such as the MAC address or VLAN priority bits are used for setting the header manipulation action as well as making forwarding and QoS decisions. As will be described below, the header manipulation QoS mapping tasks are performed by the secondary packet processor 371-B.

The routing task performs Layer-3/Layer-4 packet header parameters validation (such as checksum and packet length). Traffic is classified to connections based on L3/L4 fields. Each connection determines routing operations such as NAT (network address translation) parameters, DSCP remarking, next hop IP and PPPoE termination action. Unmatched traffic from the WAN is processed by firewall logic in the CPU 310, i.e., enabling trapping to the CPU 310 selected traffic based on configurable parameters, and dropping the rest.

The secondary packet processor 372-A is designed to perform the tasks of header modification, QoS mapping, management of egress queues in the GPON and Ethernet MAC adapters, and handling the transmissions of packets, i.e., scheduling the transmission of packets, rate limiting of the transmitted packets, and handshaking with the broad bus 390 (see FIG. 3).

The header modification includes various VLAN handling operations, such as: remove, add, or replace VLAN tags in incoming packets, PPPoE termination, and other tunneling or tagging operations. The QoS mapping includes mapping the QoS guaranteed to the incoming packet. The mapping may be performed according to a flow identification (ID) number, a VLAN tag, priority bits, or IP DSCP bits designated in the packet headers.

It should be noted that the main and secondary packet processors 371-A and 372-A may be programmed to perform tasks other than those described above. In addition, the main packet processor 371-A may be configured to perform any of the tasks of header modification, QoS mapping, and management of egress queues, while the secondary packet processor 372-A may be configured to support the main packet processors in the processing of residential gateway tasks.

Figure 5:
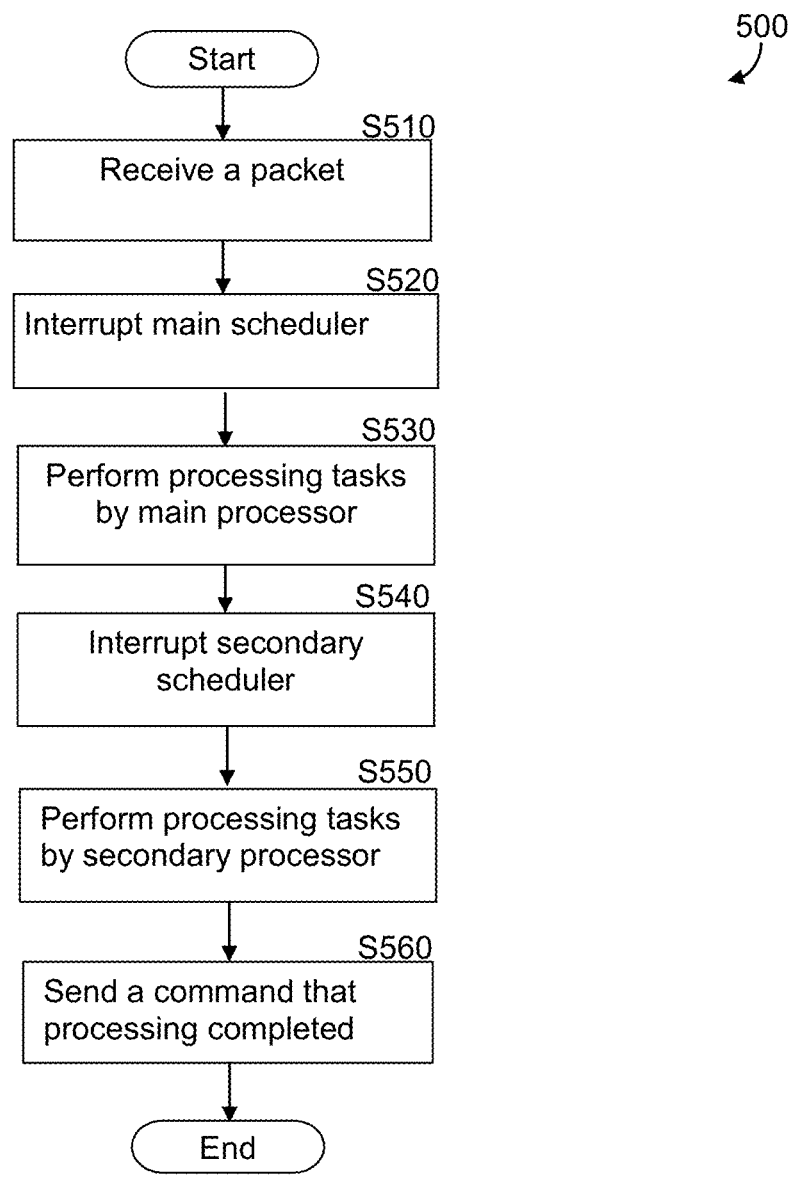
FIG. 5 is a flowchart describing a method for processing the packets by the cluster of packet processors in accordance with an embodiment of the invention.

FIG. 5 shows a non-limiting and exemplary flowchart 500 for describing the processing of packets by a cluster processor 370-A, in accordance with an embodiment of the present invention. The process will be discussed herein with reference to FIGS. 3 and 4.

At S510, an incoming packet to be processed is received from the ingress handler 380. The incoming packet may be one of a downstream packet, an upstream packet, or a local switching packet. A downstream packet is received on the external-network MAC adapter 330 and output on one of the Ethernet MAC adapters 320-*j*. An upstream packet is received from one of the Ethernet MAC adapters 320-*j* and sent, after processing, to the external-network MAC adapter 330. A local switching packet is a received packet that should be routed between devices connected to the Ethernet MAC adapters 320-*j*. All packets are sent and received through the broad bus 390. As mentioned above, the ingress handler 380 pre-processes an incoming packet to determine at least the destination cluster and memory (355 or 365) for the packet. The ingress handler 380 further parses the incoming packet and provides the parsed data including the packet descriptor and packet headers to the data memory 430. The payload of the incoming packet is written to either the internal memory 365 or external memory 355.

At S520, the scheduler 460 is interrupted to inform the main packet processor 371-A of the incoming packet. In response, the scheduler 460 triggers the execution, at S530, of the one or more tasks assigned to the main packet processor 371-A. In an embodiment of the invention, these tasks include routing or bridging the incoming packet, and IP-SEC processing, decrypting, encrypting and authentication of packets.

At S540, an interrupt is sent to the scheduler 480 of the secondary packet processor 372-A to trigger the processing tasks that the processor 372-A is configured to handle. In an embodiment of the invention, these tasks include header modification, QoS mapping, management of egress queues, and handling the transmissions of packets, all of which are discussed above. At S550, the execution of the processing tasks by the secondary packet processor 372-A takes place. During the execution, data, such as the packet descriptor is read from the data memory 430 and modified data is written back to the data memory 430. Once the processing is completed the modified packet is also written to the external memory 355 or internal memory 365, based on the decision of the ingress handler 380.

At S560, once the processing is completed by the secondary packet processor 372-A, a transmit command is sent to the broad bus handler that the processed packet is ready to be sent to its destination. Typically, S560 includes linking the packet descriptor with an output queue associated with a destination MAC adapter. Once the secondary packet processor 372-A writes the packet descriptor to the output queue, a new incoming packet can be handled by the packet processor 372-A. It should be noted that each of the packet processors 371-A and 372-A supports a multitask architecture, thus at any specific time more than one packet is being processed. In addition, the cluster of packet processors 370-A or 370-B does not require completing the processing of a packet before starting to process the next packet.

It should noted that the destination Ethernet MAC adapter 320-*j* retrieves data chunks from the internal or external memory used to store the payload using the packet description. The access to the external/internal memory is through a respective broad bus handler and the DMA engine. Upon retrieval of the entire packet at the Ethernet MAC adapter 320-*j*, the packet is transmitted to the subscriber device connected to the adapter 320-*j*.

In a similar fashion, data chunks of the processed packet are retrieved from either the external or internal memory by the external-network MAC adapter 330 and processed accordingly. For example, if the adapter 330 is a GPON MAC adapter then the retrieved data is saved in the specific T-CONT's queue. The GPON MAC adapter maintains T-CONT queues as the number of T-CONTs and cyclically requests for packets in order to fill a specific T-CONT queue. The access to the external/internal memory is through a respective broad bus handler and the DMA engine. Upon complete reception of the entire packet by the GPON MAC adapter the packet is transmitted to the OLT.

The principles of the invention are implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equiva-

What we claim is:

1. A network processor for performing residential gateway processing tasks, comprising:
a first cluster of packet processors and a second cluster of packet processors, wherein the first cluster and the second cluster include a main packet processor and a secondary packet processor, wherein the main packet processor is configured to perform routing of an incoming packet and the secondary packet processor is configured to perform a task off-loaded from the main packet processor;
a plurality of Ethernet media access control (MAC) adapters configured to interface with a plurality of subscriber devices connected to a residential gateway;
an external-network MAC adapter configured to interface with a wide area network (WAN) connected to the network processor; and
an ingress handler configured to enable processing of the incoming packet by one of the first and the second clusters having a smaller processing load between the first and the second clusters to load balance the processing of the incoming packet between the first cluster and the second cluster.

2. The network processor of claim 1, further comprising:
a central processing unit (CPU) configured to execute commands received from the first cluster and the second cluster; and
a broad bus configured to enable communication to the first cluster, the second cluster, the plurality of Ethernet MAC adapters, and the external-network MAC adapter.

3. The network processor of claim 2, further comprising:
an internal memory unit configured to store data processed by the first and the second clusters; and
an arbiter, coupled to the internal memory unit, configured to arbitrate access requests to the internal memory unit.

4. The network processor of claim 3, wherein the network processor is further coupled to an external memory unit and is configured to store the data processed by the first and the second clusters.

5. The network processor of claim 4, wherein the external memory unit comprises: a double data rate (DDR) type, and wherein the internal memory unit comprises: a static random-access memory (SRAM) type.

6. The network processor of claim 4, wherein the ingress handler is configured to decide which of the internal memory unit or the external memory unit to send a payload of the incoming packet based on at least one of: a source address of the incoming packet, a destination address of the incoming packet, an input port number, a protocol type, or a Virtual Local Area Network (VLAN) tag.

7. The network processor of claim 1, wherein the WAN is a Gigabit passive optical network (GPON) and the external-network MAC adapter is further configured to process traffic in accordance with a GPON standard.

8. The network processor of claim 1, wherein the WAN is an Ethernet PON (EPON) and the external-network MAC adapter is further configured to process traffic in accordance with an EPON standard.

9. The network processor of claim 1, wherein the WAN is an Active Ethernet network and the external-network MAC adapter is further configured to process traffic in accordance with an Active Ethernet standard.

10. The network processor of claim 1, wherein the first cluster and the second cluster each comprises: a data memory unit and a set of accelerators shared by the main packet processor and the secondary packet processor.

11. The network processor of claim 1, wherein the off-loaded task comprises:
header modification;
quality of service (QoS) mapping;
management of egress queues in the external-network MAC adapter and the plurality of Ethernet MAC adapters;
scheduling transmission of packets;
rate limiting of packets transmitted after processing by the first and the second clusters of packet processors; or
handshaking with a broad bus.

12. The network processor of claim 1, wherein the main packet processor is further configured to:
encrypt and decrypt data packets,
block unauthorized access,
bridge packets, locally switch packets, or
perform IP security (IP Sec) protocol processing.

13. The network processor of claim 1, wherein the load balancing performed by the ingress handler is further based on actual traffic load of the first cluster and the second cluster, wherein the one of the first and the second clusters having a smaller traffic load between the first and the second clusters is enabled to process the incoming packet.

14. The network processor of claim 13, wherein the ingress handler is further configured to:
maintain lookup tables to map a destination and source MAC addresses to access both the external MAC adapter and the plurality of Ethernet MAC adapters,
parse the incoming packet, and
manage an ingress queue for the first and the second clusters.

15. The network processor of claim 1, wherein the main packet processor is characterized as having higher processing power than the secondary packet processor.

16. The network processor of claim 1, wherein at least one of: the first cluster of packet processors or the second cluster of packet processors further comprises:
a set of accelerators shared by the main packet processor and the secondary packet processor;
a data memory unit shared by the main packet processor and the secondary packet processor; and
an internal bus configured to communicate between the main packet processor and the secondary packet processor.

17. The network processor of claim 16, wherein the set of accelerators comprises:
a lookup table;
a cyclical redundancy checking (CRC) engine;
a direct memory access (DMA) engine;
an external memory lookup table;
a board bus interface;
a security engine; or
a set of Semaphores to synchronize the main and the secondary packet processors.

18. The network processor of claim 16, wherein the data memory unit comprises: a read/write memory that is configured to store data corresponding to the processing tasks executed by the main packet processor and the secondary packet processor.

19. The network processor of claim 1, wherein at least one of: the first cluster of packet processors or the second cluster of packet processors further comprises:
a main scheduler, coupled to the main packet processor, configured to schedule a first process thread to be executed by the main packet processor;

a main context memory, coupled to the main packet processor, configured to store a first instance of a first register to be used by the main packet processor;

a main program memory, coupled to the main packet processor, configured to store a first instruction of a first task to be executed by the main packet processor;

a secondary scheduler, coupled to the secondary packet processor, configured to schedule a second process thread to be executed by the secondary packet processor;

a secondary context memory, coupled to the secondary packet processor, configured to store a second instance of a second register to be used by the secondary packet processor; and a secondary program memory, coupled to the secondary packet processor, configured to store a second instruction of a second task to be executed by the secondary packet processor.

20. The network processor of claim 19, wherein:

the main scheduler is further configured to interrupt the main packet processor to trigger execution of the first instruction upon reception of the incoming packet, the secondary scheduler is further configured to interrupt the secondary packet processor to trigger execution of the second instruction upon reception of the incoming packet, and the secondary packet processor is further configured to provide a transmit command to the network processor to indicate that a processed incoming packet is ready to be sent to its destination once the execution of the second instruction is completed.

21. The network processor of claim 1, Wherein at least one of the first cluster of packet processors or the second cluster of packet processors is further configured to:

process a downstream packet received from the WAN;

process an upstream packet received from a subscriber device connected in a local area network (LAN); or process a local switching packet that is routed between subscriber devices in the LAN.

* * * * *